United States Patent [19]
Rutherford, Sr.

[11] Patent Number: 5,341,996
[45] Date of Patent: Aug. 30, 1994

[54] APPARATUS FOR SEPARATING COMPONENTS OF RUBBER VEHICLE TIRES

[75] Inventor: Darrel Rutherford, Sr., Hamilton, Ohio

[73] Assignee: D&R Recyclers, Inc., Hamilton, Ohio

[21] Appl. No.: 33,583

[22] Filed: Mar. 18, 1993

[51] Int. Cl.⁵ .................. B02C 23/18; B02C 23/00; B26F 3/00
[52] U.S. Cl. .................................. 241/69; 241/301; 83/177
[58] Field of Search ......... 241/1, 23, 25, 69, DIG. 31, 241/301; 83/177, 951

[56] References Cited
U.S. PATENT DOCUMENTS

| | | | |
|---|---|---|---|
| 3,526,162 | 9/1970 | Wilcox | 83/177 |
| 3,670,971 | 6/1972 | Schneider | 241/69 |
| 4,408,724 | 10/1983 | Meyer | 241/69 |
| 4,658,683 | 4/1987 | Phillips | 83/177 |
| 4,693,153 | 9/1987 | Wainwright et al. | 83/177 |
| 5,035,362 | 7/1991 | Mazurkiewicz | 241/1 |

Primary Examiner—Richard K. Seidel
Assistant Examiner—Paul M. Heyrana, Sr.
Attorney, Agent, or Firm—George Wolken, Jr.

[57] ABSTRACT

An apparatus is described for separating components of rubber vehicle tires. This apparatus has two, substantially parallel platforms, one above the other, and a means for varying the separation between them. A rubber tire to be processed is positioned on the lower platform on a rotatable portion thereof. The upper platform has mounted thereon a plurality of rotary nozzles through which high-pressure fluid is directed onto said tire, fragmenting the rubber components from said tire and flushing them away with the effluent stream of fluid while leaving substantially clean steel cord behind on said lower platform.

14 Claims, 5 Drawing Sheets

Figure 2A
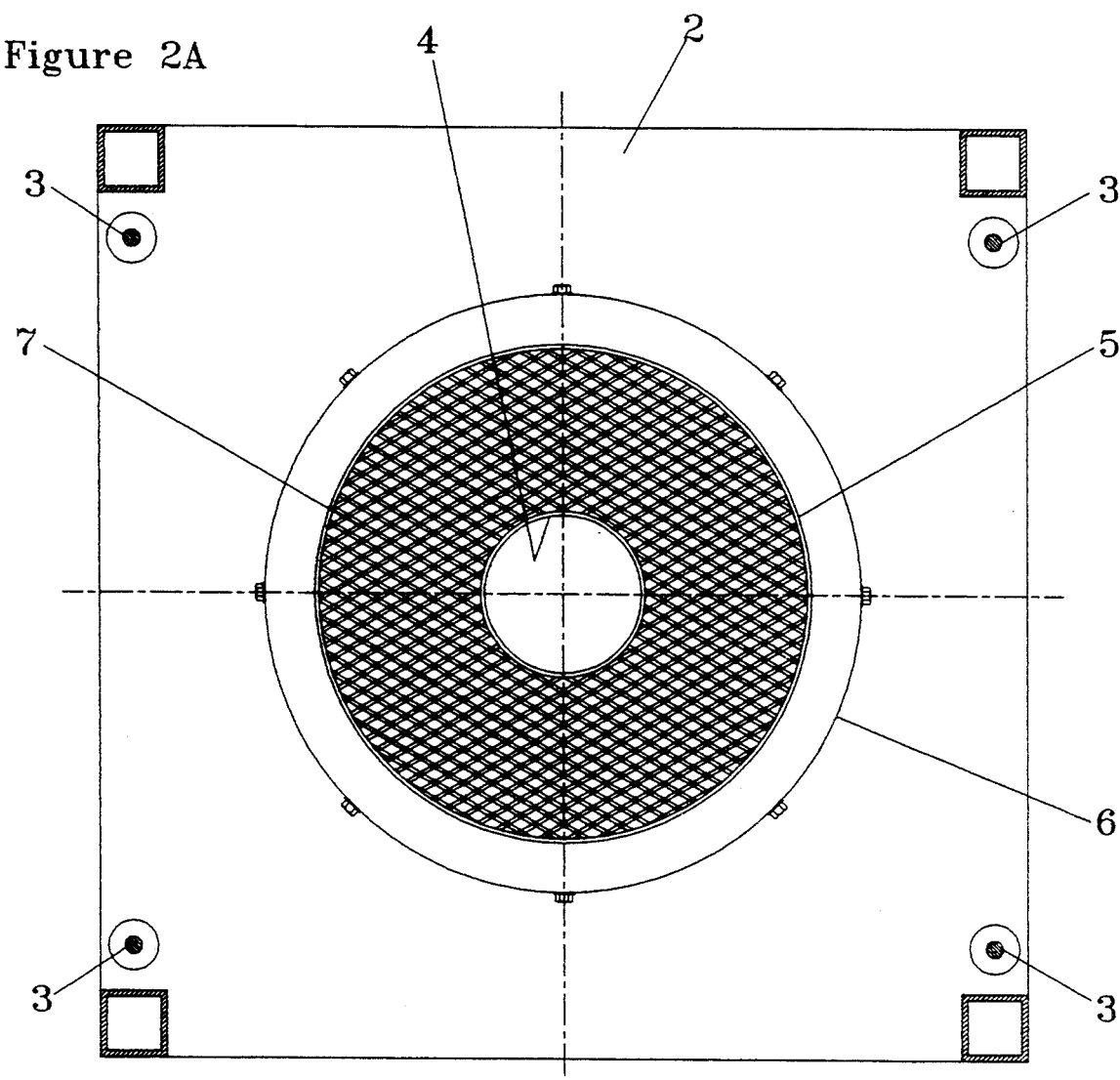
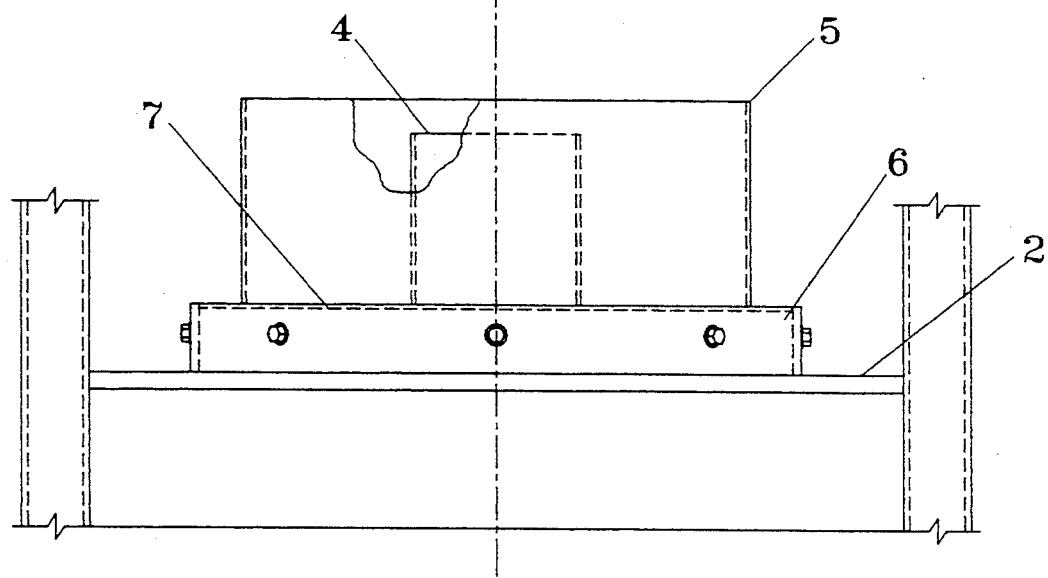
Figure 2B

Figure 3A
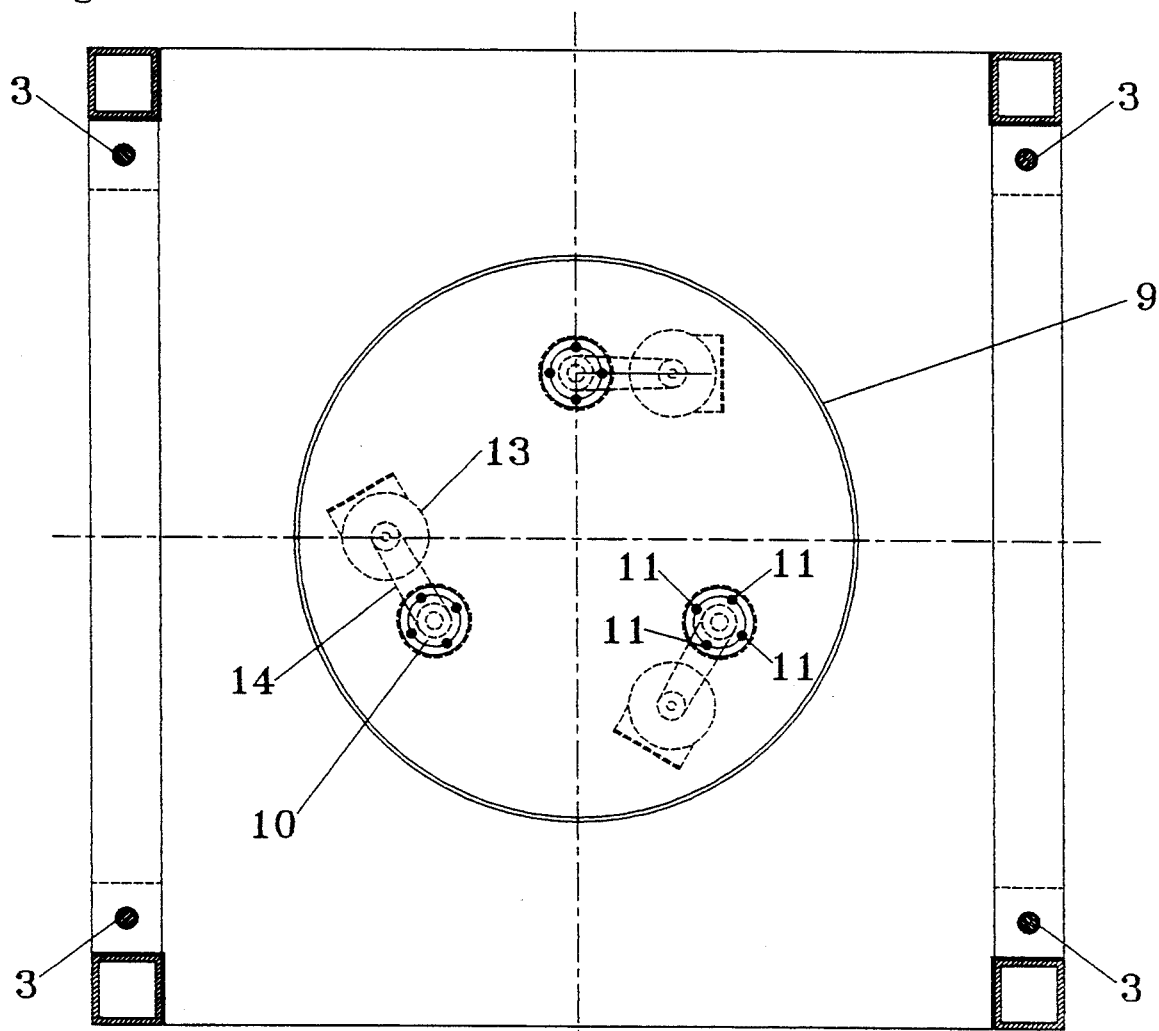
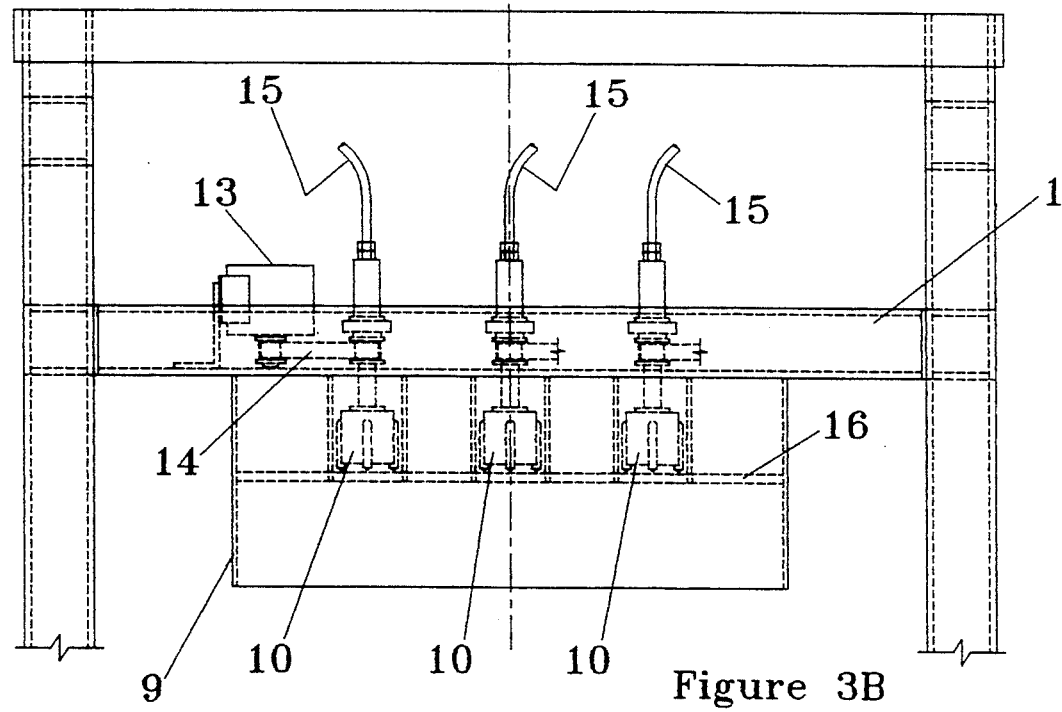
Figure 3B

APPARATUS FOR SEPARATING COMPONENTS OF RUBBER VEHICLE TIRES

BACKGROUND OF INVENTION

This invention relates generally to the field of recycling solid waste materials, and more particularly to an apparatus for processing rubber vehicle tires, effecting a separation of the various constituent materials comprising such tires, facilitating reclamation and recycling of said materials.

It has been estimated that up to 8 billion scrap rubber tires lie throughout the United States waiting for a suitable method for disposal while approximately 250 million new tires are added to the stream of commerce every year, ultimately requiring disposal. Environmentally safe tire disposal has thus become a major concern in the national effort for improved environmental quality. The problem has reached such a level that special taxes for research into disposal methods have been imposed, and special funds have been earmarked for research into environmentally-friendly tire disposal methods (such as the California Tire Grant Program).

Faced with a problem of this magnitude and this importance, many methods for tire disposal have been investigated, and are still under investigation. Many of the methods begin with mechanical shredding of the tire such as described in the patents of Moore U.S. Pat. No. 4,813,614 and Granite U.S. Pat. No. 4,015,782. Thin jets of high pressure water have been used by Tugov (USSR patent 213,339) to cut the tire into fragments. All such methods suffer from the same basic drawback: that is, having incurred the time and cost of fragmenting the whole tire, what is to be done with the fragments? Recent practice has been to bury the fragments in a landfill. Shredding prior to burial is advantageous only in that it reduces the free volume required to bury each tire, thereby conserving landfill. This is a short-term solution at best and will shortly be ended by legislation.

Burial in landfills is becoming increasingly difficult as landfills are closed and acceptable sites for new landfills become harder to locate. Also, the problem of malicious or accidental fires involving large accumulations of scrap tires is a serious concern to communities, leading to increased pressures for an effective solution to the tire disposal problem. The problem of disposing scrap tires is becoming such a concern that legislation is under consideration requiring tire vendors to demonstrate acceptable disposal means for each new tire placed into the stream of commerce.

Combustion is another method of tire disposal, either with or without prior shredding. The smoke and soot generated by tire combustion must obviously be controlled, but this seems to be possible with present technology. Finely shredded rubber from scrap tires (often called "granulite" or "crumb rubber") has been used as a fuel source commonly known as "tire derived fuel". Such fuel has been used as an energy source in the generation of electricity, in the production of paper and cement, and in various other industries. Apparently, such burning of suitably fragmented tires (or occasionally whole tires) can be performed in an environmentally safe manner if proper precautions are taken. However, use as a fuel is not the highest and best use of the crumb rubber obtainable from a scrap tire; the recovery value of scrap steel in the tire is lost entirely; and the ash-encrusted steel must still de disposed of, typically in a landfill.

Recycled rubber from tires can also be used as a component of various products commonly known as "tire derived products". Such products include asphalt paving mixtures and as extenders in a variety of rubber products such as roofing materials, walk pads, carpet and flooring underlay and other products. More such products are being demonstrated as time goes on.

Tires typically consist of a reinforcing cord (often steel cord in modern tires), woven typically into a mat, and circumferentially surrounding the tire beneath the road-contacting surface of the tread. A primary purpose of this cord is to strengthen the tire against damage from puncture or impact with holes or road debris. Modern steel cording is typically a rather high quality steel.

Tires also typically contain several heavy metal bands or wires imbedded in the rubber for support on the inner circumference of the tire, where the tire contacts the rim of the wheel. This "bead" is typically a very strong and heavy steel, difficult to shred in many mechanical shredders or causing excessive wear on the shredding devices.

In addition to cord and bead, tires also typically consist of several layers of synthetic or naturally-occurring products arranged into tread, various other plies, sidewalls, inner lining, etc. The precise composition and configuration will typically vary considerably, depending on the type of tire, its intended use and service life, desired market price, and consumer preferences. Such "rubber-like" materials may have a variety of different chemical compositions, and be arranged in differing physical configurations for each tire type, manufacturer, etc. For convenience, we will use the term "rubber" to denote all such rubber-like materials comprising vehicle tires.

Additional support and cohesion is introduced into many tires by using a fabric cord (typically nylon or rayon) imbedded in the rubber and typically located in regions of the tire not contacting the road.

Thus, for purposes of this description, we identify four components of typical vehicle tires: 1) steel cords, 2) bead 3) fabric (or non-metallic) cords, 4) rubber.

Rubber and fabric cord can typically be burned as tire derived fuel, or used in other tire derived products (occasionally following further separation and/or processing). The steel cords and beading will typically have some values as scrap metal, if separated in a reasonably clean state. Obtaining effective separation of the various components of a tire in a form suitable for reuse or combustion as a fuel, such that no part of a scrap tire must end its life in a landfill, is a major objective of the present invention.

Mechanical shredding is one method in use today for reducing tires prior to burial in landfills or prior to combustion. However, mechanical shredding typically does not separate the steel cords (or other cording materials) from the shredded rubber tire. Therefore, the shredded rubber is rendered useless for many additional purposes. The economic value of the scrap steel is effectively lost. Following combustion of the rubber/steel, the surface of the steel is typically too encrusted with ash and combustion by-products to make separation and recovery economically worthwhile.

In addition, typical mechanical shredding operations produce particles of rubber scrap generally too large for convenient use as a fuel or as an additive in asphalt paving. Further processing, adding to the costs, would be required to derive economic benefit from reuse of such component materials (although the patent of B. H. Granite U.S. Pat. No. 4,015,782 addresses this problem).

Wear on mechanical shredding devices is a serious concern. For this reason larger tires, such as truck or tractor, are typically not recycled. Also, even for passenger car tires, the heavy steel bead can often produce unacceptable wear on shredders. It is often recommended that tires be "debeaded" before shredding (i.e., physically cut and remove the bead and immediately surrounding rubber from the rest of the tire). Clearly, such debeading adds to the cost of tire recycling and leaves the bead and attached rubber to be disposed of in an acceptable manner.

Efforts to ease such problems of shredding have included the use of cryogenic fluids (liquid nitrogen) to crystallize tires into brittle matter, allowing fragmentation by mechanical crushing (U.S. Pat. No. 4,813,614). The economic advantages of using liquid nitrogen to dispose of garbage have yet to be demonstrated.

Prior work by the present inventor (U.S. Pat. No. 5,115,983; hereinafter "'983") describes a process for using jets of high pressure water (or similar fluid perhaps containing abrasive additives), directed in such manner and under such pressures, to shred the rubber from a tire. The '983 process shreds the rubber into the effluent stream of water, while leaving clean steel behind. This '983 water process naturally separates the crumb rubber from the steel in a single step, allowing the steel to be bundled for resale and recycling, while (typically following drying and screening for size separation) the crumb rubber is in a form suitable for numerous uses in addition to use as a fuel. The advantages the '983 separation process are described more completely in the referenced patent.

The present invention consists of an apparatus using at least one rotating nozzle to direct the jets of water onto all portions of a tire, thereby performing the '983 process in a single step. The present apparatus is capable of separating rubber from the steel contained in a tire, flushing the rubber away from the steel while leaving clean steel behind. Obvious modifications of the present apparatus allow the recycling of tires of various sizes (passenger car, truck etc.) and the processing of previously shredded tires.

SUMMARY AND OBJECTS OF THE INVENTION

The present invention relates to an apparatus for processing scrap rubber vehicle tires and, by means of high-pressure fluid directed onto the tire by at least one rotary nozzle, shredding the rubber from the steel constituents of the tire, flushing thereby the shredded rubber into the effluent stream while leaving the steel behind.

A primary object of the present invention is to provide an apparatus using high-pressure fluid for producing shredded rubber from scrap vehicle tires in which mechanical shredding of the tires is not required.

Another object of the present invention is to recycle scrap tires producing thereby shredded rubber in sizes sufficiently small to use subsequently as tire derived fuel or in tire derived products.

Another object of the present invention is to recycle scrap tires to produce a separation of the rubber material from the cording and beading material of said tires.

Yet another object of the present invention is to separate steel tire cording from the rubber material of scrap tires.

Another object of the present invention is to recycle rubber tires in which serious fragmentation of steel cording material does not occur.

Yet another object of the present invention is to accomplish with high-pressure fluid separation of rubber from the cord and bead of rubber vehicle tires, in which the effluent water stream contains very small amounts of fragmented cord or bead.

Another object of the present invention is to produce scrap steel from scrap tires in reusable form, lacking significant surface contamination of the steel.

DESCRIPTION OF DRAWINGS

FIG. 2A. Orthographic top view of the lower platform of tire processing apparatus.

FIG. 2B. Orthographic side view, partially cut-away, of the lower platform of tire processing apparatus.

FIG. 3A. Orthographic top view of the upper platform of tire processing apparatus.

FIG. 3B. Orthographic side view of the upper platform of tire processing apparatus.

DESCRIPTION OF PREFERRED EMBODIMENTS

Figure 1:
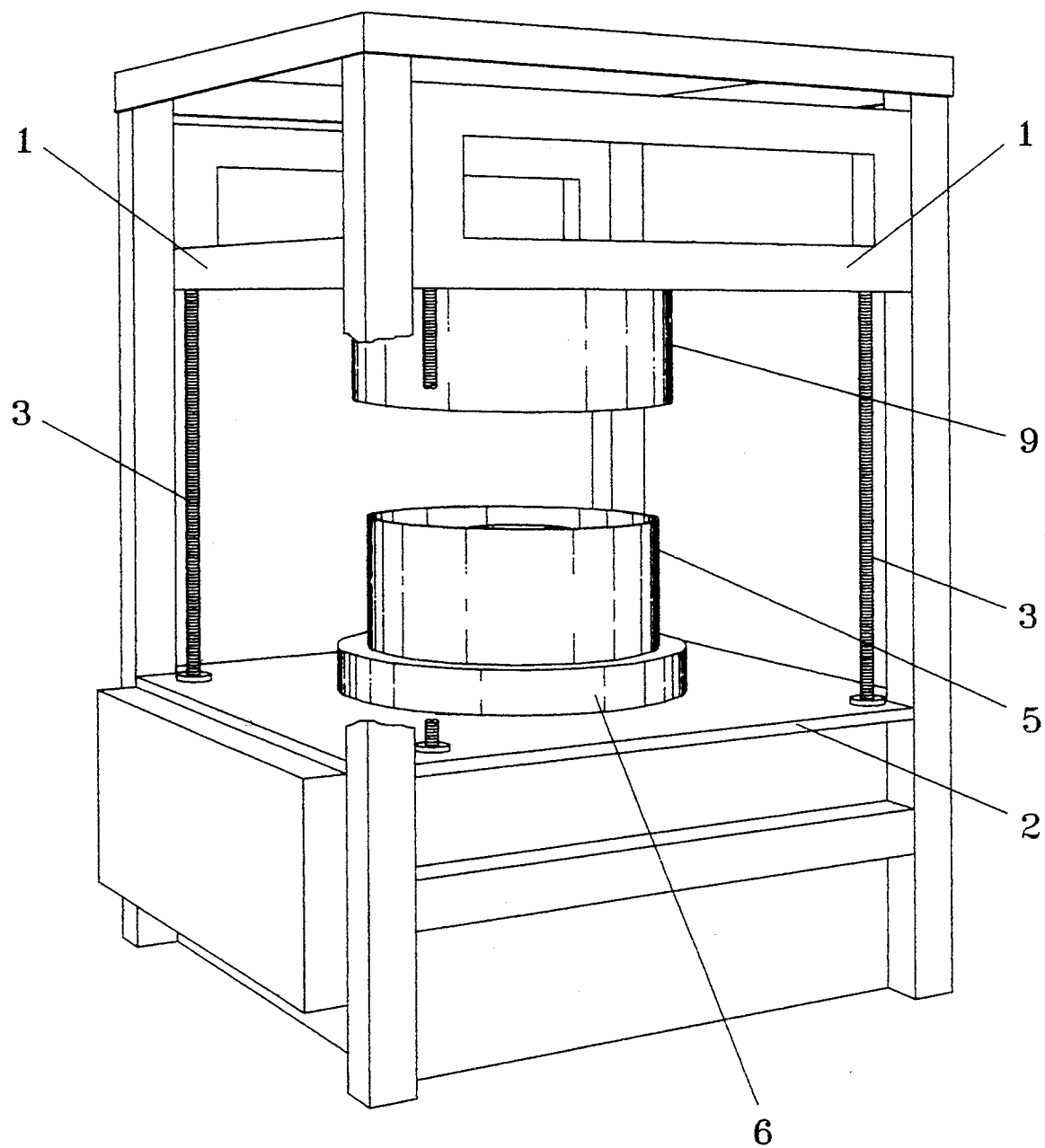
FIG. 1. Perspective view, partially cut-away, of tire processing apparatus.

FIG. 1 shows a typical apparatus for processing rubber vehicle tires and separating the rubber and steel components thereof. The essential nature of the present apparatus comprises two platforms; an upper platform, 1, and a lower platform, 2, substantially parallel. Means are provided for changing the separation of platforms 1 and 2 while other means are provided for directing high-pressure fluid onto all portions of the tire. The embodiment described in detail below is the embodiment of this basic structure as presently preferred. However, the particular description of the present apparatus is not meant to limit the present invention by excluding obvious modifications or alternatives to the particular structures disclosed herein.

The embodiment of FIG. 1 shows the upper platform, 1, movable in the vertical direction by means of threaded rods, 3, while the lower platform, 2, does not undergo vertical motion. It would be an obvious modification to reverse the roles of upper and lower platforms, having 1 stationary while 2 moves vertically, or have both move towards each other at more or less the same time. However, the presently preferred embodiment has upper platform, 2, movable in the vertical direction by means of threaded rods, 3. The embodiment of FIG. 1 shows 4 threaded rods, 3, positioned one at each corner of movable platform 1. By rotating rods, 3, in unison, a smooth vertical motion of platform, 1, is achieved. Hydraulic motors are typically used to turn rods, 3, in the present invention while uniformity of motion is achieved by chain or belt connections between the rods. Electric or other turning means can be substituted as well as other means for achieving concerted rotation of rods, 3 and resulting smooth vertical displacement of platform, 1. Hydraulic or electrical hoists or elevators could also be employed to cause relative vertical motion of platforms 1 and 2, all within the contemplation of the present invention as well as equivalent means for achieving substantially the same result.

More detailed consideration of lower platform, 2, is given in FIGS. 2A and B. Typically, in the present invention, the tire to be processed (8, in FIG. 4) is positioned on platform 2. While platform 2 is envisioned not to undergo vertical displacement, the portion of platform, 2, upon which the tire rests will typically undergo rotational motion about the central vertical axis of platform 1 and the central vertical axis of the apparatus of FIG. 1 (axis A in FIG. 4). The key to the present invention is to direct high-pressure fluid onto all portions of the tire of sufficient intensity and duration to separate the constituent materials of the tire. This is done in the present invention by rotating the tire under at least one nozzle, although other means for achieving substantially the same result would be obvious to one having ordinary skill in the art.

Figure 4A:
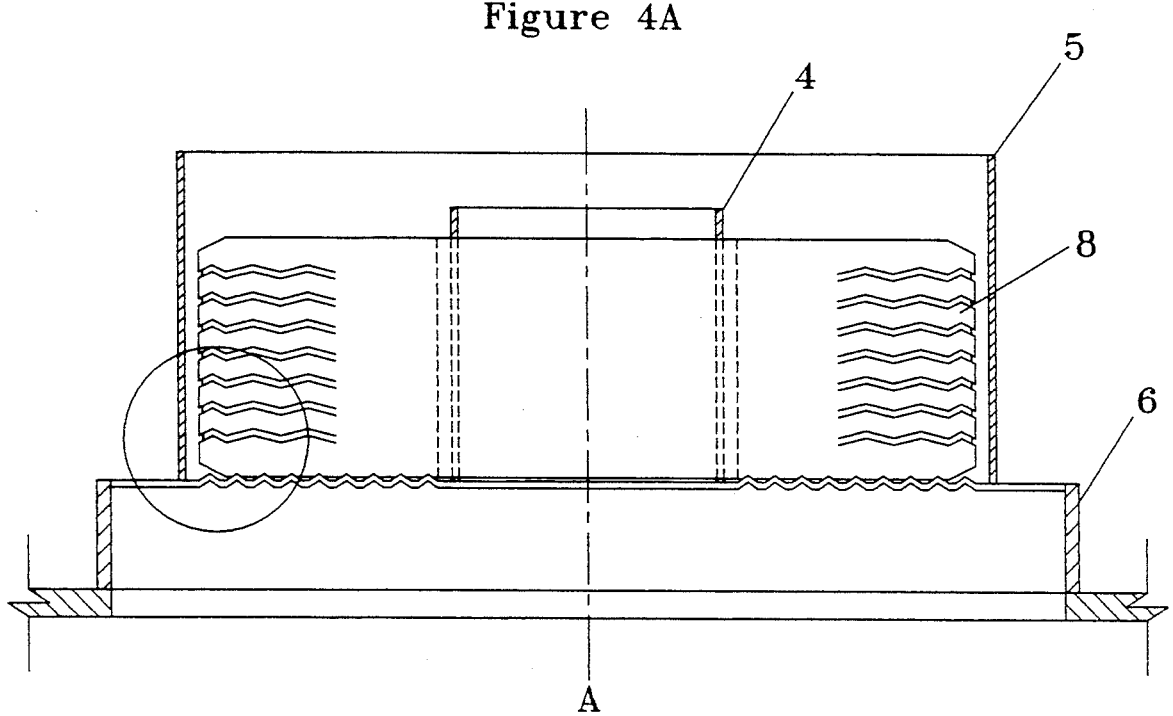
FIG. 4A. Orthographic side view of lower platform of tire processing apparatus with tire.

FIG. 4 shows in additional detail the positioning of the tire, 8, on platform, 2. Inner cylindrical segment ("cylinder" in brief), 4, is designed such that the inner circumference of tire, 8, will surround inner cylinder, 4, tending to hold the tire in position. An outer cylinder, 5, is typically used which surrounds the outer circumference of tire, 8, further tending to keep the tire in position. An additional function of cylinder 5 is to contain the splatter of the high-pressure fluid and debris from the decomposing tire, 8, during processing. While cylinders 4 and 5 are one means for containing the tire and debris, other clamping means could also be employed, such as retaining straps, an upper compression screen or retaining hooks, for example. Cylinders 4, 5 and tire 8 will be located substantially coaxially in the present apparatus along axis A of FIG. 4

The high-pressure fluid is intended to decompose tire, 8, into rubber fragments and steel cord. The baseplate upon which the tire is positioned, 7, is therefore, constructed with holes therein allowing the fluid to exit from the region between cylinders 4 and 5 (the "processing zone"), and carry along with it fragmented rubber and similar debris from tire, 8 while retaining on top of baseplate 7, in the processing zone, the steel cording and beading of tire, 8. The exact size and shape of such openings can be adjusted to insure that fragments of tire are retained in the processing zone for sufficient time to be fragmented into the required size. However, larger sized fragments may also be desired, in which case slightly larger openings in baseplate 7, may be employed in conjunction with proper processing conditions to generate particles of the desired range of sizes. Typically openings of 0.5 to about 3 inches have been employed in the present apparatus, although very different openings could easily be used without affecting the essential nature of the present invention. Since the steel cord of a typical tire is constructed in a large mat, while the bead is typically a large circle of steel surrounding the inner circumference of the tire, any reasonable size openings suffice to retain these tire components on top of baseplate, 7.

Figure 4B:
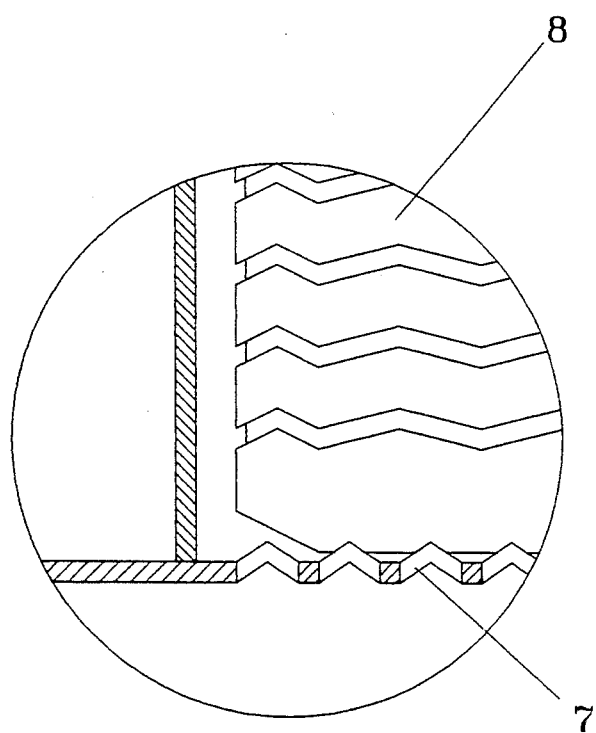
FIG. 4B. Magnified portion of FIG. 4A.

FIG. 4B shows an expanded view of the region of contact between tire, 8 and baseplate 7. It is convenient in the present invention to use a baseplate, 7 having serrations thereon in order to increase the friction between tire and baseplate, thereby assisting in the task of keeping the tire, 8, in position for processing. The present invention uses serrations in baseplate 7, although spikes or other means could also be employed.

The processing fluid and fragments of tire contained therein exit from the apparatus by passing through baseplate, 7, for subsequent processing. Filtration, drying and screening are envisioned as means to separate the rubber fragments from the effluent stream of fluid and render it suitable for recycling and reuse. The effluent fluid would typically be further processed, typically through settling tanks or other means, and reused in the present apparatus. However, such equipment for processing of the effluent fluid stream for recovery of tire fragments and reusable fluid are not part of the present apparatus.

An important feature of the present invention is to direct high-pressure fluid onto all portions of the tire, 8, for thorough processing. One way to assist in this task is to cause the tire, 8 to rotate under the processing nozzles. This is accomplished in the present invention by having cylinders 4 and 5, and baseplate 7 attached to a collar, 6. Collar, 6, typically rests in a hole in platform, 2, but is otherwise free to rotate within this hole. Collar, 6 may be rotated by any convenient diesel, electric, hydraulic or other means (not shown) causing the entire subassembly (cylinders 4 and 5, baseplate 7, collar, 6), and tire, 8 resting therein, to rotate about axis A. Typically, the rotation of collar, 6 (and all components thereon) will be independently controlled from the vertical displacement of platform 2, allowing maximum flexibility in controlling the process of tire destruction.

In addition, it may be convenient in the present invention to construct several subsystems comprising collar, 6, cylinders 4 and 5 and baseplate, 7 suitable for processing tires of different sizes (that is, passenger car, various truck, tractor tires, etc.) The outer diameter of each collar, 6 would be the same to fit into the hole in platform, 2 of the standard apparatus. However, the diameters of cylinders 4 and 5 would be different depending upon the particular size tire intended to be processed by that particular subsystem. Thus, the present invention can process tires of differing sizes merely by changing the entire subsystem, 4, 5, 6, and 7 (along with possible redirection of high-pressure streams of fluid, 12). This would permit accumulating batches of different sized tires for processing. Proper engineering design can insure that removing and replacing subsystem 4, 5, 6, and 7 is not a complex or time consuming task. (If cylindrical segment, 9 is present on the upper platform, this too would have to be replaced whenever cylinder 5 is replaced. A more complete discussion appears below.)

FIGS. 3A and B show more detailed views of the construction of upper platform, 1. In the present invention it is envisioned that platform, 1, will contain nozzles for directing fluid under high-pressure onto tire, 8 for fragmentation and destruction. The typical working fluid will be water. However, abrasive additives have also been added to the water to increase the fragmentation power of the water, thereby reducing the processing time. The present invention would be functional whether employing water, water with certain additives, or some other liquid entirely, so long as the particular liquid effectively separates rubber from steel tire material. Therefore, we use the term "fluid" herein to denote any such liquid used in conjunction with the present apparatus to fragment tires although we envision that unadulterated water will be the fluid of choice.

The present invention has a cylindrical segment, 9 ("cylinder" in short) attached to the lower surface of platform, 1, and substantially coaxial with axis A of FIG. 4. The diameter of cylinder 9 is chosen to encompass cylinder 5 when platform 1 and 2 are brought together. Thus, cylinder, 9, serves to add to the containment of water and tire debris during processing. It may be useful to eliminate either cylinder, 9 or cylinder, 5 providing a suitably tight seal of the remaining cylinder with the opposite platform is achieved. This "single cylinder" configuration would be particularly useful when cylinder 9 is eliminated from the upper platform, 10 as this would simplify the replacement of subassembly 4, 5, 6, and 7 to handle tires of various sizes.

We show in FIG. 3, three nozzles, 10, for directing high-pressure fluid onto the tire, 8. Three nozzles are shown merely to be definite. At least one nozzle is certainly required, but any convenient number of nozzles can be used. Three to six rotary nozzles with 2–4 streams exiting from each nozzle have been used in the present apparatus with satisfactory results. The present invention envisions that each such nozzle will itself rotate about its own central axis as the tire (rotating atop baseplate 7) passes beneath it. Therefore, high-pressure fluid exits from each nozzle, 10 in a rotary pattern while tire, 8 passes beneath it. It is envisioned that this dual rotary action provides effective tire destruction in the present apparatus.

Figure 5:
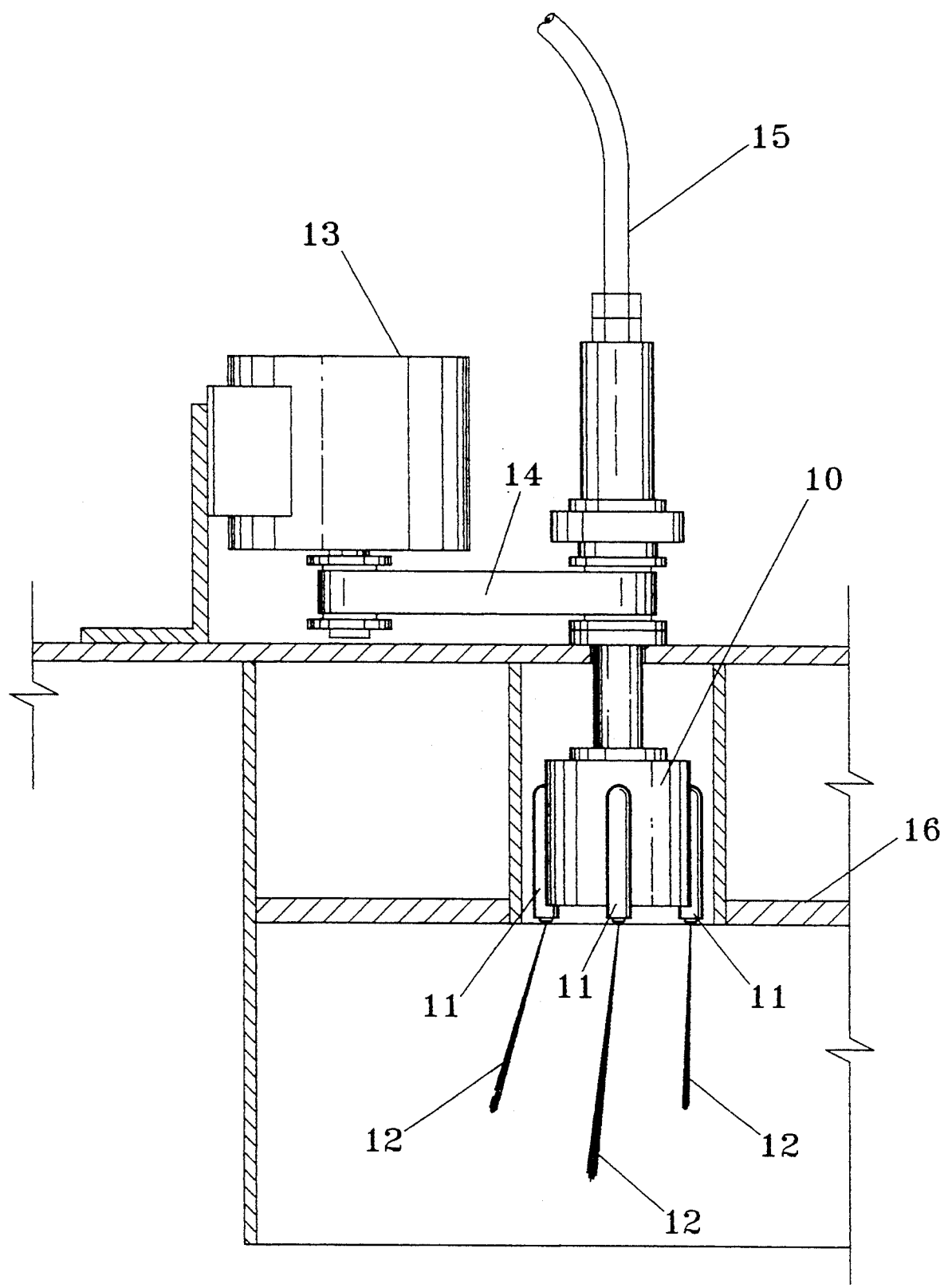
FIG. 5. Expanded view of rotating nozzle with independently directed streams of fluid exiting therefrom.

FIGS. 3 and 5 show as 11 a plurality of outlets for high-pressure fluid on each rotary nozzle. At least one fluid outlet is clearly required on each rotary nozzle, but any convenient number can also be employed. We show herein 4 fluid outlets merely to be definite. A lesser or greater number can be employed. More outlets increase the processing effectiveness of the apparatus, but require larger (and, therefore, more expensive) pumps to supply the larger volume of fluid required each second. Various engineering trade-offs can thus be made for various processing environments.

It should be noted in FIG. 3A that the rotary nozzles are located substantially at the same radius from the axis of rotation. Therefore, each rotary nozzle will pass over approximately the same radial portion of tire, 8, as tire, 8 rotates beneath such rotary nozzles, 10. To insure processing of all parts of tire, 8, the fluid outlets, 11 of each nozzle are frequently constructed to be aimed independently of the others. Thus, in FIG. 5 we show fluid outlets, 11 directed to skew the streams of fluid, 12 onto a portion of tire, 8, not passing directly beneath nozzle 10. This is one convenient method for insuring adequate processing of all portions of the tire, although staggering the location of nozzles in a radial direction away from axis A could also be done.

It is common for rotary nozzles, 10 to be caused to rotate by the reactive forces of high-pressure fluid exiting from outlets, 11 at a slight angle, causing thereby a torque sufficient to rotate nozzles, 10. This may be done in the present invention also. However, in the debris-laden environment of the processing zone between cylinders 4 and 5, this may cause nonuniform rotation of nozzles, 10 and subsequent imprecise process control. For this reason, we show as 13 a drive motor (hydraulic, electric, etc.) connected to each rotary nozzle, 10, ensuring constant rotational speeds throughout the process (or varying rotational speeds, but under the direction and control of the process operator). FIGS. 3 and 5 show a separate drive motor, 13, connected to each rotary nozzle, 10, by means of a separate drive belt or chain, 14. It is not necessary that each nozzle, 10 have a separate motor, 13 However, other combinations of several nozzles, 10, being driven from a single motor with a single large drive belt (or several small drive belts) would be an obvious modification of the present apparatus.

The tubing, 15 carrying high pressure fluid to the rotary nozzles, 10 must pass through a suitable connector permitting rotation without interfering with the tubing, 15. However, such technology is well known in the art of high-pressure technology and is not described here.

Experimental operation of the present apparatus indicates that steel cording protruding from partially fragmented tires can occasionally become entangled with rotary nozzles, 10. For this reason, a "ceiling" shield, 16 was added to cylinder, 9. This ceiling has holes therein sufficient for clearance of the rotary nozzles and the fluid streams exiting therefrom, 10, but allows minimal space for debris from the tire (especially dangling steel cords) to contact and become enmeshed with rotary nozzles, 10. In addition, ceiling, 16 can be used itself to apply pressure to the tire, 8, during processing, causing thereby compression of the tire and more effective processing.

Numerous modifications, alterations or substitutions could be made to the present apparatus by one having ordinary skills in the art. However, we present the apparatus herein as the presently preferred embodiment of such a tire fragmentation apparatus.

I claim:

1. An apparatus for separating components of rubber vehicle tires comprising;
    a) an upper platform having securely attached thereto at least one downwardly directed nozzle for passing high-pressure fluid therethrough; and
    b) a lower platform having said rubber vehicle tire located horizontally substantially on the central portion of the upper surface of said lower platform, said lower platform located below said upper platform and substantially parallel therewith, and wherein said lower platform has a plurality of holes therethrough, said holes having size and location permitting said fluid and fragmented components of said tire to pass while retaining on the upper surface of said lower platform the substantially unfragmented components of said tire; and
    c) a means for varying the separation between said upper and said lower platforms;
    d) a means for directing said high-pressure fluid onto substantially all regions of said tire;
    e) a means for rotating the tire containing central portion of said lower platform and said tire thereon about a vertical axis of rotation passing substantially through the center of said tire.

2. An apparatus as in claim 1 further comprising, upwardly directed from said lower platform, impaling means hindering movement of said tire during fragmentation.

3. An apparatus as in claim 1 further comprising two upwardly directed coaxial cylindrical segments securely attached to the upper surface of said tire containing portion of said lower platform, wherein said cylindrical segments are coaxial with each other and with (the axis of rotation) of said tire containing portion, and wherein said outer cylindrical segment encompasses the outer circumference of said tire, and wherein said inner cylindrical segment is encompassed by the inner circumference of said tire.

4. An apparatus as in claim 3 further comprising means for detaching and reattaching said tire containing portion and said cylindrical segments attached thereto from said lower platform.

5. An apparatus as in claim 3 further comprising a downwardly directed cylindrical segment securely attached to the lower surface of said upper platform, said cylindrical segment having size and location encompassing said outer cylindrical segment attached to said tire containing portion of said lower platform.

6. An apparatus as in claim 1 wherein said openings in said lower platform have lateral dimensions of approximately 0.5 to 3 inches.

7. An apparatus as in claim 1 wherein said downwardly directed nozzle comprises a plurality of rotary nozzles.

8. An apparatus as in claim 7 wherein each of said rotary nozzles has connected thereto a means for rotating said nozzles at a substantially constant rate.

9. An apparatus as in claim 7 wherein each of said rotary nozzles comprises a plurality of separate fluid streams exiting therefrom.

10. An apparatus as in claim 9 further comprising a means for independently controlling the direction of each of said fluid streams.

11. An apparatus as in claim 10 wherein said nozzles are symmetrically disposed on said upper platform, substantially on the circumference of a circle, and wherein said fluid directing means comprises independent aiming of said fluid streams exiting from said nozzles.

12. An apparatus as in claim 7 further comprising a means for shielding said rotary nozzles from entanglement.

13. An apparatus as in claim 7 wherein said plurality of rotary nozzles consists of from 3 to 6 nozzles wherein each of said nozzles has from 2 to 4 independent fluid streams exiting therefrom.

14. An apparatus as in claim 1 wherein said means for varying said platform separation comprises a plurality of threaded rods connecting said upper and lower platforms, wherein said rods rotate synchronously.

* * * * *